United States Patent [19]

Jackson

[11] Patent Number: 4,493,373

[45] Date of Patent: Jan. 15, 1985

[54] DYNAMIC SEAL FOR WELL TOOLS

[75] Inventor: Gerald D. Jackson, Broken Arrow, Okla.

[73] Assignee: Baker Oil Tools, Inc., Orange, Calif.

[21] Appl. No.: 522,986

[22] Filed: Aug. 15, 1983

[51] Int. Cl.³ .......................... E21B 34/10; F16J 15/16
[52] U.S. Cl. .................................... 166/321; 277/165; 277/188 A
[58] Field of Search ................. 166/321, 120; 277/165, 277/168, 188 A

[56] References Cited

U.S. PATENT DOCUMENTS

| 2,784,013 | 3/1957 | Groen | 286/26 |
| 3,081,061 | 3/1963 | Conrad | 251/172 |
| 3,272,520 | 9/1966 | Woolfenden | 277/165 |
| 4,294,314 | 10/1981 | Miyagishima | 166/318 |
| 4,384,726 | 5/1983 | Meyer | 277/59 |

FOREIGN PATENT DOCUMENTS 1558425  3/1980  United Kingdom ........... 277/188 A

Primary Examiner—Stephen J. Novosad
Assistant Examiner—Michael Starinsky
Attorney, Agent, or Firm—Norvell & Associates

[57] ABSTRACT

A dynamic seal for use between reciprocal concentric tubular members is disclosed herein and is especially adaptable for use in providing a dynamic seal between a movable piston and a sleeve in a downhole oil or gas well tool, such as a safety valve, a hydraulically actuated packer or a sliding sleeve. Each dynamic seal assembly comprises an elastomeric T-seal with cylindrical backup members positioned on either side of the central tip section of the seal member. The elastomeric T-seal is received within a central annular groove and a seal receptacle and the backup members are positioned within recessed ledges on opposite sides of the central groove. The backup members provide extrusion resistance for the tip section of the dynamic T-seal and overlap the T-seal to hold the seal in place. The cylindrical members are also positioned between the recessed ledges and the polished sealing surface of the other tubular member to support any radial forces so that a uniform load or squeeze is applied to the elastomeric T-seal member.

10 Claims, 7 Drawing Figures

DYNAMIC SEAL FOR WELL TOOLS

BACKGROUND OF THE INVENTION

1. Field of the Invention

This invention relates to a dynamic elastomeric seal assembly and extrusion backup for use between reciprocal tubular members, such as a shiftable piston and stationary sleeve in an oil well tool, such as a safety valve, hydraulically actuated packer or sliding sleeve.

2. Description of the Prior Art

The standard T-seal and backup configuration used on downhole well tools is shown and identified as prior art in FIG. 7. These standard configurations comprise an elastomeric primary seal having a T-shaped cross-section which can be positioned within an annular groove in either an inner or outer concentric tubular member. The narrower tip section generally extends beyond the seal receptacle groove to establish sealing contact with a polished seal surface. The width of the groove is generally equal to the width of the enlarged base section of the T-seal.

In some applications it is necessary to provide extrusion backups for a conventional T-seal. As shown in the prior art in FIG. 7, cylindrical backup members can be positioned within the groove of the seal receptacle with the cylindrical backup members being positioned adjacent the tip section and above the base of the seal member. These conventional T-seal configurations have proven to be very reliable in many conventional well tool applications. However, at elevated pressure and temperatures extrusion can occur causing a dynamic seal failure. With the conventional dynamic T-seal configuration, the cylindrical backup members are also supported by the base of the elastomer and radial loads are transmitted through the cylindrical backup members to the more elastic base section of the primary seal. These radial loads can produce an eccentric or uneven load or squeeze on the elastomeric T-seal, and the seal will be heavily loaded at one position and more relaxed or even leaking at the radially opposite position. Even if this radial loading does not cause the seal to leak, undesirable vibration problems can occur during shifting of the movable piston and the life of the T-seal can be reduced. The instant invention provides an improved dynamic seal configuration in which cylindrical extrusion backups also serve to center the shiftable piston and retain the dynamic seal in place with an even load distribution providing a uniform squeeze on the seal member.

SUMMARY OF THE INVENTION

A sealing apparatus for establishing dynamic sealing integrity between two axially reciprocal concentric tubular members, such as a movable piston and a stationary sleeve in a well tool, is disclosed. Sealing assembly in the preferred embodiment of this invention comprises an elastomeric T-seal having a tip section and an enlarged base section received within a seal receptable having a central annular groove and recessed ledges on either side of the central annular groove. The depth of the central annular groove is greater than the depth of the recessed ledges, and the base section of the dynamic T-seal is received within the central annular groove. A cylindrical member is then positioned on either side of the tip section of the elastomeric seal with the recessed ledges supporting the cylindrical backup member.

These backup elements have a thickness greater than the depth of the recessed ledges to reduce the axial extrusion gap between the seal receptacle and the polished seal surfaces of the mating concentric tubular member. In addition to preventing axial extrusion of the elastomeric sealing member, the cylindrical backup members contact both the recessed ledges and the polished seal surface to center the movable piston relative to a stationary concentric tubular member, such as a sleeve or housing, in a subsurface safety valve, hydraulically actuated packer or sliding sleeve.

DETAILED DESCRIPTION OF THE PREFERRED EMBODIMENT

Subterranean well tools, such as safety valves, sliding sleeves and hydraulically actuated packers, generally employ concentric tubular members which are reciprocal during operation of the tool. In a hydraulically actuated subsurface safety valve, an axially reciprocal piston located within an outer housing bore is normally used to actuate a flow closure member in response to an increase in control fluid pressure. Hydraulically actuated packers often employ axially shiftable pistons located in a fluid pressure chamber to expand the slips and packing elements on the packer. Sliding sleeves can also be employed to close ports extending radially through a well conduit. Each of these well tools is an example of a dynamic well tool in which sealing integrity must often be maintained between two axially shiftable tubular members.

Figure 1:
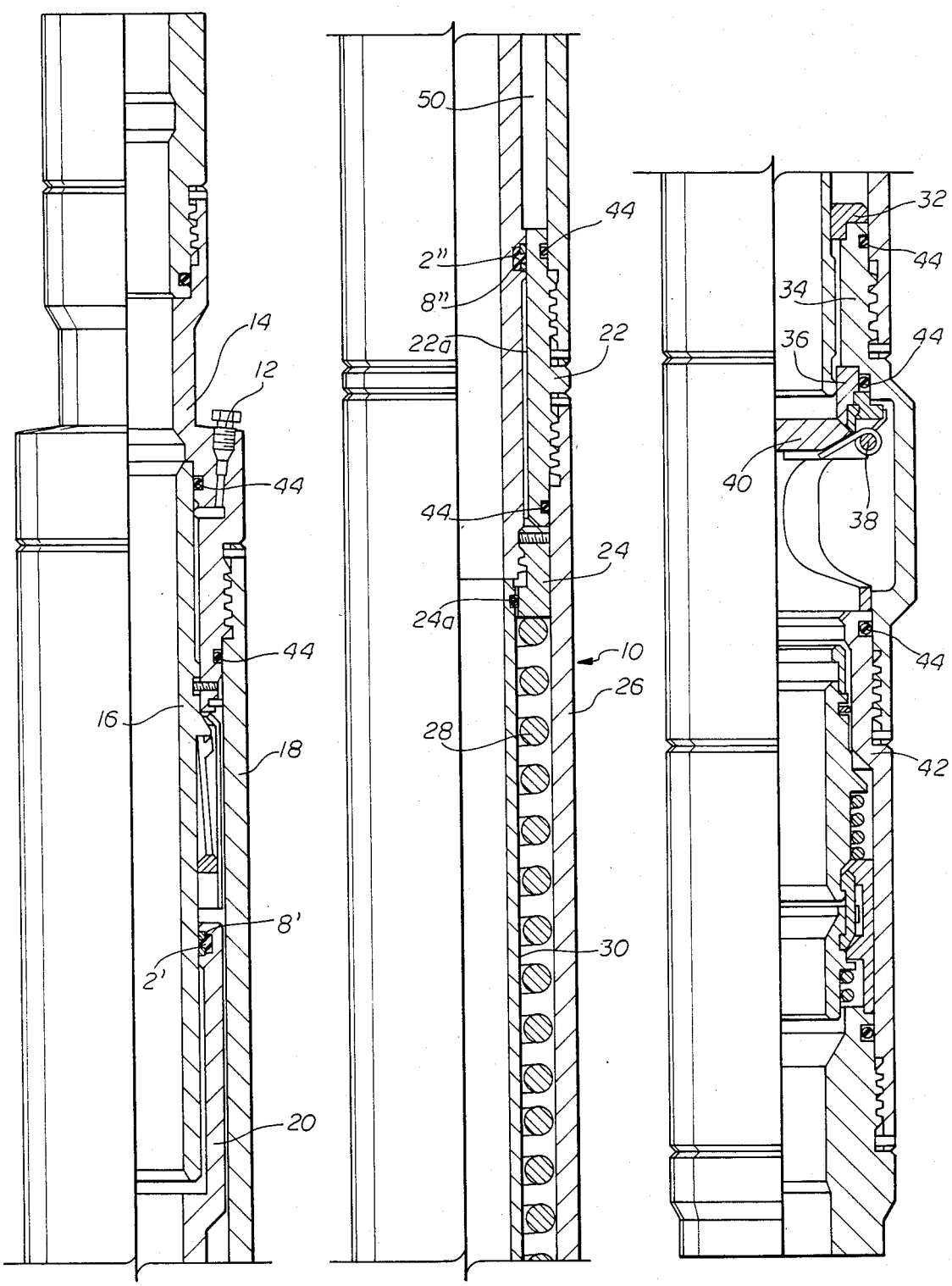
FIG. 1 is a longitudinal sectional view of a subterranean safety valve incorporating improved dynamic seals.

The subsurface safety valve shown in FIG. 1 is one example of a tool used in subterranean oil and gas wells in which dynamic sealing integrity must be maintained between two axially shiftable tubular members. Dynamic elastomeric sealing elements, commonly referred to as T-seals because of the cross-sectional T-shape of the elastomeric seal member, are often used to provide sealing integrity between moving tubular components. The T-seals 2' and 2", one male and the other female, are used to maintain sealing integrity between piston 20 and fixed housing components 16 and 22 in the preferred embodiment of this safety valve. These T-seals can be of conventional construction and can be fabricated from conventional elastomers used in subterranean oil tools. For example, T-seals 2' and 2" could be fabricated from a fluoroelastomer, such as Viton, a trademark of Dupont.

In safety valve 2 shown in FIG. 1, flow through the valve and through the subterranean well conduit is controlled by movement of a valve closure member, such as flapper 40, which is opened or closed in response to changes in control fluid pressure. Safety valve 10 is a tubing mounted safety valve which can be incorporated as an integral part of a tubing string used for production of hydrocarbon fluids from a producing formation. The dynamic seal used in this safety valve could also be employed with a wireline set safety valve in which the valve would be suspended from a lock engaging a lock receiving nipple incorporated into the tubing string.

A ported nipple 14 having a control line port 12 forms the uppermost portion of the housing of safety valve 10. Port 10 further comprises a control line connection for establishing communication between the safety valve and an external control line (not shown) extending to the well surface. Ported nipple 14 is attached to upper valve housing sleeve 18 by means of a conventional threaded connection and is attached to an inner sleeve 16 by means of a shear pin connection. An axially reciprocal piston 20 is received concentrically within the upper valve housing sleeve and a portion of the piston 20 extends circumferentially around the lower portion of sleeve 16. A female T-seal 2' positioned within a cooperable seal receptacle 8' encircles the inner sleeve 16 to establish dynamic sealing integrity between piston 20 and sleeve 16. A male elastomeric seal 2" encircles piston 20 for establishing sealing integrity between the outer periphery of the piston and the inner peripheral bore of a central housing sleeve or connection 22. This housing sleeve, or intermediate member, has a seal bore surface 22a along which sealing integrity is to be established by elastomeric seal 2" located within a cooperable seal bore reciprocal 8". Intermediate sleeve member 22 has external threads for establishing a conventional threaded connection with the upper valve housing sleeve 18 and a similar lower valve housing sleeve 26. A fluid pressure chamber 50 is defined between the outer valve housing sleeve 18 and a similar lower valve housing sleeve 26. A fluid pressure chamber 50 is defined between the outer valve housing sleeves 18 and 22 and two inner tubular members, piston 20 and sleeve 16. Fluid pressure chamber 50 communicates with port 12 and the control line port attachable thereto. Seals 2' and 2" are positioned so that the pressure within chamber 50 acts on a net upwardly facing surface area on piston 16 so that increase in the pressure in chamber 50 will cause downward axial movement of piston 20 relative to sleeve 16, housing sleeve 18 and housing sleeve 22.

Piston 20 is attached by means of a threaded connection to an upper spring retainer 24 shown in abutment with housing section 22 when piston 20 is in its uppermost configuration as shown in FIG. 1. Spring retainer 24 is in turn affixed to a lower piston extension 30 by means of a ring 24a. Lower piston section 30 extends concentrically within outer housing sleeve 26 and a spring cavity containing spring 28 is defined therebetween. The upper end of spring 28 abuts a downwardly facing surface on upper spring retainer 24 and the lower end of spring 28 abuts an upwardly facing surface on lower spring retainer 34 which in turn abuts flapper valve housing 34. Flapper valve housing 34 is attached to the lower valve housing sleeve 26 by means of a conventional threaded connection. Spring 28, shown in its most relaxed state in FIG. 1, urges piston 20 to its uppermost position relative to flapper valve housing 34. A valve base 36, located adjacent the lower end of piston section 30 in FIG. 1, is affixed to valve housing 34 and a rotatable flapper valve closure member 40 is affixed to valve base 36 by means of a hinge pin 38.

Valve 40 is shown in its closed position in FIG. 1 with the lower end of piston extension 30 being spaced from the upper face of the flapper valve head 40. A lowermost housing section 42 is attached to the lower end of flapper valve housing 34 by means of a conventional threaded connection. Tubing mounted safety valve can then be attached by means of appropriate subs to the tubing string extending below the valve.

To actuate the valve shown in FIG. 1, control pressure in the external control line (not shown) is increased to cause piston 20 to move downwardly against the action of spring 28. Sealing integrity is maintained by seals 2' and 2" so that the pressure acting on the piston in chamber 50 is greater than the pressure acting below the shiftable piston assembly. When control pressure is increased sufficiently to cause downward movement of piston 20 and piston extension 30, the lower end of piston extension 30 will engage the upper surface of flapper closure head 40. Continued downward movement of the piston assembly will cause flapper head 40 to rotate about hinge 38 to open the production conduit through the valve. Subsequent reduction in control pressure acting in chamber 50 will permit piston 20 and piston extension 30 to move upward in response to force exerted by spring 28 so that flapper valve head 40 may be closed. The dynamic T-seals 2' and 2" used on opposite surfaces of piston 20 differ from the conventional static O-ring seals 44 used between nonmovable elements of the valve assembly.

As shown in greater detail in the enlarged views of FIGS. 2-5, the dynamic seals used herein comprise not only a principal elastomeric member 2' or 2" but also comprise backup cylindrical members 4 and 6 located on opposite ends of the T-seals and a seal reciprocal for receiving both the elastomeric seal member and the cylindrical backup members. It is apparent, in comparing FIGS. 2 and 3, that the male and female T-seals each have a tip section 2a and an enlarged base section 2b forming a generally T-shaped cross-sectional configuration. Each T-seal can comprise a unitary molded seal configuration. The enlarged base section 2b of each seal is received within a central annular groove 8b in seal receptacles 8.

Figure 2:
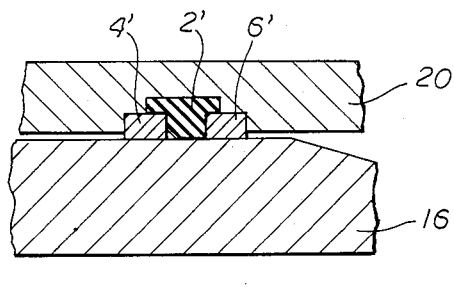
FIG. 2 is an enlarged view of the female dynamic seal used on the valve shown in FIG. 1.
Figure 3:
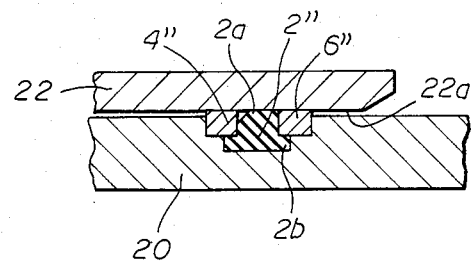
FIG. 3 is an enlarged view of the male dynamic seal used in the valve shown in FIG. 1.
Figure 6:
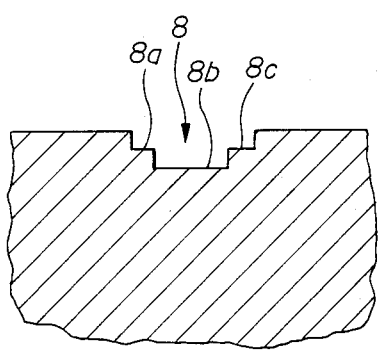
FIG. 6 is a view of the seal receptacle shown in FIG. 3.

FIG. 6 illustrates a seal receptacle for receipt of a male seal, such as shown in FIG. 3, without the seal in place. The central annular groove 8b is located between recessed ledges 8a and 8c, each extending completely around the periphery of the tubular member. Seal receptacles 8 can be machined into a single metallic tubular member as is shown in the preferred embodiment of this invention or a seal receptacle could be defined at the intersection of two abutting tubular members. The depth of central groove 8b is greater than the depth of either of the flanking recessed ledges 8a and 8c. As shown in FIGS. 2 and 3, the central groove 8b is dimensioned to receive the base section 2b of a seal with the tip section 2a protruding therefrom. As shown in FIGS. 2 and 3, the tip section 2a of each seal will extend beyond the periphery of the seal receptacle for establishing sealing integrity along a polished seal surface of a cooperable concentric tubular member.

Two backup members 4 and 6 are located on either side of the tip section 2a. These cylindrical backup members 4 and 6 are positioned within recessed ledges 8a and 8c so that cylindrical backup members 4 and 6 are supported by the ledges in either the male or female configuration. In the preferred embodiment of this invention, these cylindrical members 4 and 6 are formed from a material, such as polytetrafluoroethylene, often referred to using the Dupont trademark Teflon, which has a resistance to axial extrusion less than that of the centrally located primary elastomeric seal members 2' and 2".

Figure 7:
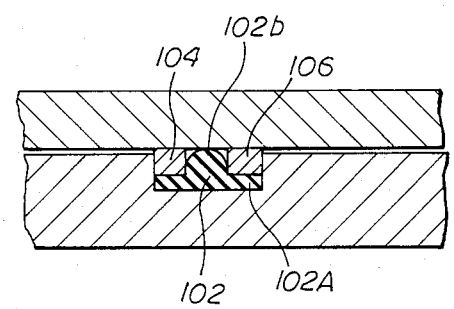
FIG. 7 is a comparative illustration of a prior art dynamic seal.

Each cylindrical member 4 and 6 is dimensioned to protrude beyond the periphery of the seal receptacle to reduce the axial gap between the seal receptacle and the polished surface of the other concentric tubular member. In both FIGS. 2 and 3, the cylindrical members are shown in contact with the cooperable seal bore surface. Since cylindrical members 4 and 6 are shown supported between ledges 8a and 8c and the other concentric member, it is apparent that any radial movement or vibration of the movable piston 20 relative to the stationary sleeve members will be minimized by these cylindrical members. Piston 20 will therefore be centered relative to inner and outer stationary sleeve members. Cylindrical members 4 and 6 also overlap the lower base section 2b on opposite sides of seal tip section 2a to hold the seal firmly within its seal receptacle. Since the cylindrical members 4 and 6 are supported by ledges 8a and 8c and overlap seal base section 2b, the base section 2b does not support radial loads transmitted through the cylindrical backup as would be the case with the conventional prior art dynamic T-seal shown in FIG. 7. The increased axial length of backups 4 and 6 also serve to limit extrusion of the elastomeric seal through any gap between the cylindrical members and the polished sealing surface. Note that the seals 2' and 2" shown in FIGS. 2 and 3 are shown under the action of an axial force so that backup members 6 and 6' are preventing extrusion of the elastomeric seal member therepast.

Figure 4:
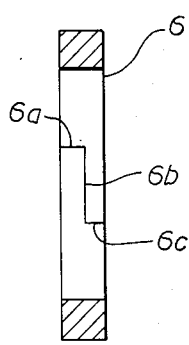
FIG. 4 is a view of the cylindrical backup members shown in FIGS. 2 and 3.
Figure 5:
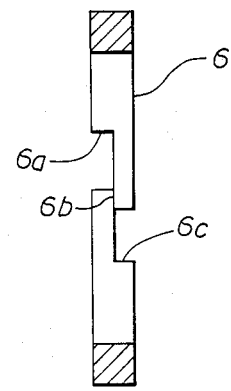
FIG. 5 is a view of the cylindrical backup members shown in FIG. 4 in an expanded configuration.

FIGS. 4 and 5 show that each cylindrical seal member used herein can comprise a split member having axial abutting ends 6a and 6c separated by a circumferentially extending slit 6b. FIG. 5 illustrates that radial expansion of ring 6 in which the axial ends are separate will not prevent the cylindrical members from acting as an effective extrusion backup. The circumferentially extending mating faces 6b will merely shift or slide relative to each other while still maintaining contact and continuing to provide a continuous extrusion backup. This configuration is also useful in the assembly of the female seal assembly shown in FIG. 2. In order to assemble the cylindrical members 4 and 6, these members must be collapsed to slide within an exterior tubular member. Once in position adjacent the recessed ledges 8a and 8b, the cylindrical backup members can be expanded so that the split ends occupy the relaxed configuration shown in FIG. 4. The male seal assembly shown in FIG. 3 can use a continuous Teflon member which can be slightly heated to expand the Teflon member to permit it to be slipped over the periphery of the inner seal receptacle into position along recessed ledges 8a and 8c.

Although the invention has been described in terms of the specified embodiment which is set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Sealing apparatus for establishing dynamic sealing integrity between two axially reciprocal concentric tubular members in a tool, comprising:

unitary elastomeric seal means encircling the inner and the two concentric tubular members for establishing dynamic sealing integrity therebetween during relative movement, the seal means having a T-shaped cross-section with base and tip sections, the base section being wider than the tip section;

a seal receptacle on one of the two concentric tubular members for receipt of the seal means, comprising a central annular groove dimensioned for receipt of the seal base and recessed ledges on each side of the central groove, the depth of the central groove being greater than the depth of the recessed ledges; and cylindrical means on opposite sides of the seal tip section, each overlapping at least a portion of the seal base section, the cylindrical means being supported by the recessed ledges, the cylindrical means extending beyond the periphery of the seal receptacle to reduce the radial gap between the two concentric tubular members above and below the sealing means for backing up the elastomeric seal means to decrease the axial extrusion of the T-shaped seal means due to temperature and pressure acting thereon; the cylindrical means contacting the other of the concentric tubular members to center the inner tubular member relative to the outer tubular member, uneven radial loads being applied to the cylindrical members rather than the elastomeric seal means whereby a uniform circumferential squeeze is maintained on the elastomeric seal means.

2. The sealing apparatus of claim 1 wherein the cylindrical means comprises a cylindrical member having slit mating ends, each mating end having an axially extending portion, the axially extending portions separating upon radial expansion of the cylindrical means, and a circumferential slit portion, adjoining circumferential slit portion remaining in at least partial contact during expansion of the cylindrical means to form a continuous barrier against axial extrusion of the seal means.

3. The sealing apparatus of claim 1 wherein the cylindrical means comprises polytetrafluoroethylene elements.

4. An apparatus for use in a subterranean well for controlling the flow of fluids through a well conduit comprising:

flow closure means;

a sleeve having a bore extending therethrough;

a cylindrical piston located in concentric relation to the sleeve bore and shiftable to actuate the flow closure means;

unitary elastomeric seal means encircling the innermost of the piston and sleeve for establishing dynamic sealing integrity between the piston and the sleeve during relative movement therebetween, the seal means having a T-shaped cross-section with base and tip sections, the base section being wider than the tip section;

a seal receptacle on one of the piston and sleeve for receipt of the seal means, comprising a central annular groove dimensioned for receipt of the seal base and recessed ledges on each side of the central groove, the depth of the groove being greater than the depth of the recessed ledges; and cylindrical members on opposite sides of the seal tip section, each overlapping at least a portion of the seal base section, the cylindrical members being supported by the recessed ledges, the cylindrical members extending beyond the periphery of the seal receptacle to reduce the radial gap between the sleeve and piston above and below the seal means for backing up the elastomeric seal means to decrease the axial extrusion of the T-shaped seal means due to temperature and pressure acting thereon; the cylindrical members contacting the sleeve to center the piston relative to the sleeve, uneven radial loads being applied to the cylindrical members rather than the elastomeric seal means whereby a uniform circumferential squeeze is maintained on the elastomeric seal means.

5. The apparatus of claim 4 wherein the cylindrical members comprise polytetrafluoroethylene elements for reducing the sliding friction between the piston and sleeve.

6. A subterranean safety valve for use in controlling the flow of fluids through a well conduit comprising:
  a valve housing;
  a flow bore through the valve housing communicating with well conduit;
  means for opening and closing the flow bore;
  a reciprocal piston received in the housing bore for actuating the opening and closing means upon movement of the piston relative to the valve housing;
  unitary elastomeric seal means encircling the piston for establishing dynamic sealing integrity between the piston and valve housing during relative movement therebetween, the seal means having a T-shaped cross-section with base and tip sections, the base section being wider than the tip section;
  a seal receptacle on one of the piston and valve housing flow bore for receipt of the seal means, comprising a central annular groove dimensioned for receipt of the seal base and recessed ledges on each side of the central groove, the depth of the central groove being greater than the depth of the recessed ledges; and
  cylindrical extrusion backup members for preventing axial extrusion of the elastomeric seal positioned on opposite sides of the seal tip section, each overlapping at least a portion of the seal base section, the backup means being supported by the recessed ledges, the cylindrical members extending beyond the periphery of the seal receptacle to reduce the radial gap between the sleeve and piston above and below the seal means for backing up the elastomeric seal means to decrease the axial extrusion of the T-shaped seal means due to temperature and pressure acting thereon; the cylindrical members contacting the sleeve to center the piston relative to the sleeve, uneven radial loads being applied to the cylindrical members rather than the elastomeric seal means whereby a uniform circumferential squeeze is maintained on the elastomeric seal means.

7. The valve of claim 6 wherein the width of each backup means is greater than the width of each recessed ledge whereby each backup means abuts the seal base section and overlaps a portion of the seal base section.

8. The valve of claim 7 wherein the width of the central groove is equal to the width of the seal base section and the difference between the depth of the central groove and the recessed ledges is equal to the thickness of the seal base section.

9. The valve of claim 8 wherein the thickness of the backup means is greater than the depth of the recessed ledges.

10. The valve of claim 9 wherein the backup means comprise cylindrical polytetrafluoroethylene elements.

* * * * *